US007080026B2

(12) United States Patent
Singh et al.

(10) Patent No.: US 7,080,026 B2
(45) Date of Patent: Jul. 18, 2006

(54) SUPPLY CHAIN DEMAND FORECASTING AND PLANNING

(75) Inventors: Namita Singh, Germantown, MD (US); S. Jason Olasky, Rockville, MD (US); Kellie S. Cluff, Falls Church, VA (US); William F. Welch, Jr., Frederick, MD (US)

(73) Assignee: Manugistics, Inc., Rockville, MD (US)

( * ) Notice: Subject to any disclaimer, the term of this patent is extended or adjusted under 35 U.S.C. 154(b) by 1016 days.

(21) Appl. No.: 09/984,347

(22) Filed: Oct. 29, 2001

(65) Prior Publication Data

US 2002/0169657 A1 Nov. 14, 2002

Related U.S. Application Data

(60) Provisional application No. 60/243,425, filed on Oct. 27, 2000.

(51) Int. Cl.
*G06Q 10/00* (2006.01)
(52) U.S. Cl. ...................................................... 705/10
(58) Field of Classification Search ................... 705/10
See application file for complete search history.

(56) References Cited

U.S. PATENT DOCUMENTS

| 4,509,123 A | 4/1985 | Vereen ........................ 364/300 |
| 4,554,446 A | 11/1985 | Murphy ....................... 235/487 |
| 4,636,950 A | 1/1987 | Caswell et al. ............. 364/403 |
| 4,887,077 A | 12/1989 | Irby et al. ................... 340/825 |
| 4,887,208 A | 12/1989 | Schneider et al. .......... 364/403 |
| 4,937,743 A | 6/1990 | Rassman et al. ............ 364/401 |
| 5,091,713 A | 2/1992 | Horne et al. ................ 340/541 |
| 5,231,567 A | 7/1993 | Matoba et al. .............. 364/401 |
| 5,233,533 A | 8/1993 | Edstrom et al. ............ 364/468 |
| 5,237,495 A | 8/1993 | Morii ......................... 364/401 |
| 5,237,497 A | 8/1993 | Sitarski ...................... 364/402 |
| 5,287,267 A | 2/1994 | Jayaraman et al. ......... 364/403 |

(Continued)

OTHER PUBLICATIONS

A. J. Kaplan, "Bayesian Approach to Inventory Control of New Parts," IIE Transactions, vol. 20, No. 2, Jun. 1988, pp. 151-156.

(Continued)

*Primary Examiner*—Tariq R. Hafiz
*Assistant Examiner*—Linda Krisciunas
(74) *Attorney, Agent, or Firm*—Hogan & Hartson LLP

(57) ABSTRACT

Disclosed herein are systems and methods for demand forecasting that enable multiple-scenario comparisons and analyses by letting users create forecasts from multiple history streams (for example, shipments data, point-of-sale data, customer order data, return data, etc.) with various alternative forecast algorithm theories. The multiple model framework of the present invention enables users to compare statistical algorithms paired with various history streams (collectively referred to as "models") so as to run various simulations and evaluate which model will provide the best forecast for a particular product in a given market. Once the user has decided upon which model it will use, it can publish forecast information provided by that model for use by its organization (such as by a downstream supply planning program). Embodiments of the present invention provide a system and method whereby appropriate demand responses can be dynamically forecasted whenever given events occur, such as when a competitor lowers the price on a particular product (such as for a promotion), or when the user's company is launching new sales and marketing campaigns. Preferred embodiments of the present invention use an automatic tuning feature to assist users in determining optimal parameter settings for a given forecasting algorithm to produce the best possible forecasting model.

2 Claims, 8 Drawing Sheets

U.S. PATENT DOCUMENTS

| | | | |
|---|---|---|---|
| 5,299,115 A * | 3/1994 | Fields et al. | 705/10 |
| 5,383,112 A | 1/1995 | Clark | 364/401 |
| 5,446,890 A | 8/1995 | Renslo et al. | 395/600 |
| 5,459,656 A * | 10/1995 | Fields et al. | 705/7 |
| 5,463,555 A | 10/1995 | Ward et al. | 364/468 |
| 5,526,944 A | 6/1996 | Merl | 211/87 |
| 5,568,489 A | 10/1996 | Yien et al. | 370/110 |
| 5,581,461 A | 12/1996 | Coll et al. | 395/205 |
| 5,615,109 A | 3/1997 | Eder | 395/208 |
| 5,657,453 A | 8/1997 | Taoka et al. | 395/201 |
| 5,712,985 A * | 1/1998 | Lee et al. | 705/7 |
| 5,727,164 A | 3/1998 | Kaye et al. | 395/228 |
| 5,740,425 A | 4/1998 | Povilus | 395/611 |
| 5,765,138 A | 6/1998 | Aycock et al. | 705/7 |
| 5,765,143 A | 6/1998 | Sheldon et al. | 705/28 |
| 5,790,536 A | 8/1998 | Mahany et al. | 370/338 |
| 5,818,336 A | 10/1998 | Varga et al. | 340/545 |
| 5,823,948 A | 10/1998 | Ross et al. | 600/300 |
| 5,870,724 A | 2/1999 | Lawlor et al. | 705/42 |
| 5,884,300 A | 3/1999 | Brockman | 707/2 |
| 5,914,878 A | 6/1999 | Yamamoto et al. | 364/468 |
| 5,918,213 A | 6/1999 | Bernard et al. | 705/26 |
| 5,933,813 A | 8/1999 | Teicher et al. | 705/26 |
| 5,937,037 A | 8/1999 | Kamel et al. | 379/88.19 |
| 5,940,807 A | 8/1999 | Purcell | 705/26 |
| 5,953,707 A | 9/1999 | Huang et al. | 705/10 |
| 5,962,834 A | 10/1999 | Markman | 235/385 |
| 5,963,134 A | 10/1999 | Bowers et al. | 340/572.1 |
| 5,963,918 A | 10/1999 | Reagan et al. | 705/28 |
| 5,963,919 A | 10/1999 | Brinkley et al. | 705/28 |
| 5,963,920 A | 10/1999 | Rose et al. | 705/28 |
| 5,970,465 A | 10/1999 | Dietrich et al. | 705/7 |
| 5,974,395 A | 10/1999 | Bellini et al. | 705/9 |
| 5,974,460 A | 10/1999 | Maddalozzo, Jr. et al. | 709/224 |
| 5,983,194 A | 11/1999 | Hogge et al. | 705/7 |
| 5,995,945 A | 11/1999 | Notani et al. | 705/28 |
| 6,006,192 A | 12/1999 | Cheng et al. | 705/7 |
| 6,006,196 A | 12/1999 | Feigin et al. | 705/10 |
| 6,009,407 A | 12/1999 | Garg | 705/10 |
| 6,021,396 A | 2/2000 | Ramaswamy et al. | 705/28 |
| 6,023,683 A | 2/2000 | Johnson et al. | 705/26 |
| 6,029,140 A | 2/2000 | Martin et al. | 705/11 |
| 6,029,143 A | 2/2000 | Mosher et al. | 705/28 |
| 6,032,125 A * | 2/2000 | Ando | 705/10 |
| 6,035,284 A | 3/2000 | Straub et al. | 705/28 |
| 6,044,354 A | 3/2000 | Asplen, Jr. | 705/7 |
| 6,049,742 A | 4/2000 | Milne et al. | 700/99 |
| 6,049,781 A | 4/2000 | Forrest et al. | 705/30 |
| 6,055,516 A | 4/2000 | Johnson et al. | 705/27 |
| 6,061,691 A | 5/2000 | Fox | 707/104 |
| 6,064,967 A | 5/2000 | Speicher | 705/1 |
| 6,073,107 A | 6/2000 | Minkiewicz et al. | 705/7 |
| 6,076,071 A | 6/2000 | Freeny, Jr. | 705/26 |
| 6,078,893 A | 6/2000 | Ouimet et al. | 705/10 |
| 6,078,900 A | 6/2000 | Ettl et al. | 705/28 |
| 6,081,789 A | 6/2000 | Purcell | 705/37 |
| 6,088,681 A | 7/2000 | Coleman et al. | 705/15 |
| 6,094,641 A | 7/2000 | Ouimet et al. | 705/10 |
| 6,101,484 A | 8/2000 | Halbert et al. | 705/26 |
| 6,105,004 A | 8/2000 | Halperin | 705/28 |
| 6,115,642 A | 9/2000 | Brown et al. | 700/104 |
| 6,119,101 A | 9/2000 | Peckover | 705/26 |
| 6,138,103 A | 10/2000 | Cheng et al. | 705/7 |
| 6,148,291 A | 11/2000 | Radican | 705/28 |
| 6,151,582 A | 11/2000 | Huang et al. | 705/8 |
| 6,157,915 A | 12/2000 | Bhaskaran et al. | 705/7 |
| 6,167,380 A | 12/2000 | Kennedy et al. | 705/10 |
| 6,167,385 A | 12/2000 | Hartley-Urquhart | 705/35 |
| 6,173,210 B1 | 1/2001 | Bjornson et al. | 700/99 |
| 6,198,980 B1 | 3/2001 | Costanza | 700/99 |
| 6,205,431 B1 | 3/2001 | Willemain et al. | 705/10 |
| 6,609,101 B1 * | 8/2003 | Landvater | 705/10 |
| 6,611,726 B1 * | 8/2003 | Crosswhite | 700/99 |
| 6,745,150 B1 * | 6/2004 | Breiman | 702/181 |
| 6,804,657 B1 * | 10/2004 | Sultan | 705/10 |
| 6,816,839 B1 * | 11/2004 | Gung et al. | 705/10 |

OTHER PUBLICATIONS

International Search Report, PCT/US01/42824, Jan. 29, 2002.

* cited by examiner

Level = 10
Trend = 0
Seasonal Effects = (0,0)
Causal Effect = 0

Forecast Demand$_{t=T}$ = 10

Level = 10
Trend = 1.3
Seasonal Effects = (0,0)
Causal Effect = 0

Forecast Demand$_{t=T}$ = 22

Level = 10
Trend = 1.3
Seasonal Effects = (0.8,0.5)
Causal Effect = 0

Forecast Demand$_{t=T}$ = 19

Level = 10
Trend = 1.3
Seasonal Effects = (0.8,0.5)
Causal Effect = +0.63

Forecast Demand$_{t=T}$ = 31

SUPPLY CHAIN DEMAND FORECASTING AND PLANNING

CROSS REFERENCE TO RELATED APPLICATION

This application claims priority from U.S. Provisional Patent Application Ser. No. 60/243,425, filed Oct. 27, 2000, the disclosure of which is hereby incorporated by reference in its entirety.

FIELD OF THE INVENTION

The present invention pertains to systems and methods for supply chain planning and demand forecasting. In particular, the present invention pertains to systems and methods for proactively predicting demand across multiple levels of the supply chain so as to avoid costly mismatches of demand and supply.

BACKGROUND OF THE INVENTION

As is appreciated by those familiar with the art, mismatches of demand and supply are costly to sellers in a competitive market because such mismatches often result in missed sales opportunities, lost profits, excessive expediting costs, lost market share, and poor customer service. To maximize sales and marketing effectiveness, companies must accurately predict future customer demand and use this information to drive their business operations from manufacturing to operations to distribution. This need for accurate predictions of demand is especially important for those involved in e-business due to the ease with which buyers can find alternative sellers that can satisfy their demand.

In the manufacturing and distributing industries, supplying products in response to the current level of customer demand with a minimum of overstocking reduces stocking costs and distribution expenses and thus leads to a reduction of the sales unit price of products. Typically, this also leads to an enhancement of profit margins. It is therefore necessary for sellers to forecast product demand precisely such that they then can determine a sales plan, production plan, and distribution plan according to an accurate forecast of the demand trend of customers.

Conventional methods of forecasting demand by analyzing the trend of past sales results are performed with the goal of the forecaster being to apply the most accurate statistical analysis techniques and econometric modeling to provide the most accurate forecast possible. In these conventional methods, time series forecasting is performed which develops and uses various forecasting algorithms that attempt to describe the knowledge of the business and fluctuation trend of sales results as evidenced by past history in the form of a rule. Developing such forecasting algorithms (as well as computerized systems for utilizing such algorithms) is typically a labor-intensive task.

Unfortunately, however, it is common for product demand trends to change in a short lifecycle. When this is the case, the data used in providing a forecast rapidly becomes old and the precision of forecasting lowers. Therefore, in order to keep a high precision in forecasting, algorithms (and historic data points used to generate those algorithms) must be maintained on an ongoing basis as well as be able to adjust their forecasts relatively easily.

In addition to the difficulty in computing business demand in general is the complexity introduced by different periodic demand patterns in certain industries based upon day of the week, seasons of the year, or other recurring events. For example, in certain industries, such as the restaurant or retail industries, foot traffic, product preferences and sales volume vary according to day of the week. Similarly, predictable seasonal, annual, and/or periodic fluctuations in product demand are present to some extent in many industries. In addition, non-periodic events promotional programs, local events, holidays, and the like, all alter the demand levels faced by a business. An accurate forecast of demand must be able to accommodate these periodic and non-periodic effects on demand level. Unfortunately, the complexity of formulating a single algorithm for doing so accurately has traditionally relegated businesses to making educated guesses regarding what type of demand to expect based upon their experience and records regarding past business demand. As one might expect, as businesses become larger and more complex, making such predictions becomes more problematic and risky. Further, it is unpractical, if not impossible, for a human being to calculate and predict fluctuations in business demand on a more frequent basis (such as hourly or even daily) even though it may be desirable to do so.

Therefore, since one of the more important issues encountered in production planning stems from the uncertainties associated with future demand for products, a vast volume of literature and efforts within the industry has attempted to address this issue. Presently, however, production, materials and transportation planning based upon forecasted demand still presents a significant challenge. While there have been many studies in the demand planning theory area, the advances achieved thus far are either based upon oversimplified assumptions or alternatively are computationally infeasible for real world application. Thus, heretofore there has not been developed a flexible yet substantially automated manner by which sellers in a competitive market can satisfy their demand forecasting needs.

By way of example, U.S. patent application Ser. No. 6,049,742 to Milne et al. discloses a computer software tool for comparing projected supply planning decisions with expected demand profiles. The computer system disclosed by Milne provides routines that compare projected supply with actual experienced demand to help the user of the software tool to configure it to best meet their business's requirements. Unfortunately, like most known demand forecasting methodologies, Milne is inflexible in that it does not help users to develop and identify improved models by comparing multiple alternative models for various products within various markets.

Similarly, U.S. patent application Ser. No. 6,138,103 to Cheng et al. discloses a decision-making method for predicting uncertain demand. The Cheng system uses a matrix to represent potential demand scenarios and their relative probabilities of occurring, and these matrices are then used to calculate a production-planning schedule based upon the most probable outcome of the uncertain demand. Cheng, like Milne, fails to teach manners for developing alternative algorithms for forecasting future demand as well as fine-tuning such demand forecasting algorithms.

Additionally, U.S. Pat. No. 5,459,656 to Fields et al. discloses a system that measures and stores business demand data over a plurality of time intervals and projects the business demand for products in near-future time intervals using percentage-based demand curves. The Fields system allows the creation of a plurality of demand curves for the items to determine near-future demand by using defined functions and variables. Business demand projections for current and near-future time intervals can then be revised in response to variances in actual business demand data as it received. Fields, however, fails to produce forecasts that proactively take into account many factors that impact upon future demand including the variability of individual markets and the impact of product promotions.

Finally, U.S. Pat. No. 6,032,125 to Ando discloses a demand forecasting system that allows users to forecast demand based upon algorithms derived from data of various time periods including recent months, similar periods in previous years, and combinations thereof. The Ando patent, however, fails to take into account that data regarding past demand can come from various sources within a single organization or supply chain (such as sales data, returns, wholesale data, etc.). Further, Ando fails to teach systems or methods for deriving various demand forecasting models and revising those models over the passage of time.

Thus, there remains a need in the art for improved systems and methods that can proactively develop alternative models to predict demand across multiple levels of an organization's supply chain so as to avoid costly mismatches of demand and supply.

SUMMARY OF THE INVENTION

In light of the drawbacks inherent in the prior art, it is an object of the present invention to provide a system and accompanying methods for accurately forecasting future demand for many products and product types in many markets.

Also, it is an object of the present invention to provide a system and related methods that enables organizations to produce and compare alternative models of forecasted demand in order to constantly improve demand-forecasting capabilities.

Concurrently, it is an object of the present invention to provide such a system and method that operates across distributed computer networks whereby users can be located at various remote locations and the system can publish selected forecasts for use by an entire organization including downstream supply, manufacturing and transportation planning systems.

Similarly, it is an object of the present invention to provide a system and accompanying methods producing and identifying optimal demand forecasts that take into account independent causal factors, such as new competitive products and price promotions, that will impact upon future demand.

Further, it is an object of preferred embodiments of the present invention to a system and related method whereby users can easily account for current demand trends without having to produce an entirely new forecast.

Additionally, it is an object of preferred embodiments of the present invention to provide a system and related methods that allows users more easily to produce and compare forecasts for related products, products within related markets, and for products taking into account different forecasting models.

In response to the above-described and other needs, the present invention provides a solution for identifying and taking into account the many critical factors that drive demand by providing a multiple model framework that allows multiple alternative forecasting algorithms, including well known statistical algorithms such as Fourier and multiple linear regression ("MLR") algorithms and proprietary algorithms useful for modeling the causal factors relating to various products and/or industries, to be associated with various data streams of demand history to product advanced forecasting models. The present invention helps users to determine the forecast algorithm that best suits a given problem/industry/business from the available history streams of demand data by enabling the production of various forecasts for comparison with one another and, eventually, with incoming data relating to actual demand.

By employing multiple models for a single product or location, the present invention enables multiple-scenario comparisons and analysis by letting users create forecasts from multiple history streams (for example, shipments data, point-of-sale data, customer order data, return data, etc.) with various alternative forecast algorithm theories. As will be readily appreciated by one of ordinary skill in the art, there are various well-known and proprietary statistical algorithm alternatives that can be used in particular circumstances to predict future demand based upon historical data. The multiple model framework of the present invention enables users to compare statistical algorithms paired with various history streams (collectively referred to as "models") so as to run various simulations and evaluate which model will provide the best forecast for a particular product in a given market. Once the user has decided upon which model it will use, it can publish forecast information provided by that model for use by its organization (such as by a downstream supply planning program).

Preferred embodiments of the present invention use an automatic tuning feature to assist users in determining optimal parameter settings for a given forecasting algorithm to produce the best possible forecasting model. This feature significantly reduces the time and resources necessary for users to produce an acceptable demand forecast from history streams of demand data.

Embodiments of the present invention provide a system and method whereby appropriate demand responses can be dynamically forecasted whenever given events occur, such as when a competitor lowers the price on a particular product (such as for a promotion), or when the user's company is launching new sales and marketing campaigns. Utilizing the multiple model framework according to the present invention allows the selection, customization, and fine tuning of the appropriate forecasting algorithm to apply to a given demand problem by producing a plurality of forecasts, each forecast taking into account different demand causal factors and demand data history, and identifying and optimal forecast for adoption. According to such embodiments, users can accurately predict customers' buying plans and thereby forecast the demand for a product or product line by identifying and quantifying key variables that drive demand from the available history streams of demand data.

Embodiments of the present invention recognize that there are often several different areas for which forecast information is obtained. To this end, the multiple model framework of the present invention supports collaborative and comparative forecasting. Such collaborative and comparative forecasting can occur both internally within a single organization as well as externally across an extended supply chain community consisting of many business partners. In this manner, demand history data can be shared to create more accurate demand forecasts and adopted forecasts can be published across an entire organization or extended supply chain community. As will be readily appreciated by one of ordinary skill in the art, the demand forecasting capabilities of the present invention can be distributed across an entire enterprise or alternatively can be used regionally for specific geographic areas of an enterprise.

The present invention also provides intelligent event modeling capabilities and allows for management overrides and forecast adjustments given newly received data regarding changes in actual demand. As such, event data is incorporated into forecast models on an ongoing basis to help adjust forecast decisions on the fly and refine the forecasting process for future endeavors. By including both market planning and demand planning capabilities, the present invention links product mix, promotion, and price analyses with traditional demand forecasting.

Preferred embodiments of the present invention are computer networks and related methods that facilitate the forecasting of the demand of goods within a supply chain and associated planning functions. Preferably, in any one of the embodiments of the present invention a front-end user interface permits user to interact with one or more databases to define a plurality of decision making algorithms to customize those algorithms to leverage the expertise of the user regarding the organization. Additionally, the front-end user interface permits users to review and modify demand forecasts and adopt particular approved forecasts for publishing across the users' organization.

Embodiments of the present invention also utilize interactive graphical interfaces to help suppliers understand the impact of events on demand. Visibility of demand is thereby given across the entire trading network using collaborative forecasting capabilities that allow user to monitor demand throughout the organization. By helping to ensure that the entire organization is, or even group of collaborating organizations are, planning with the same forecast numbers, the present invention helps smooth demand variation across the trading network to facilitate more effective collaboration.

The present invention acts as an early-warning system, predicting future customer demand, alerting of potential supply problems, and finding patterns undetected by traditional solutions. It enables a company within a supply chain to understand customers' demand drivers, to more accurately predict customers' future needs, and to unify disparate planning processes through its multiple model framework and collaboration with other members of the supply chain.

Additional features and advantages of the invention are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings with like reference numbers representing corresponding parts throughout.

DETAILED DESCRIPTION OF THE PREFERRED EMBODIMENTS

Reference is now made in detail to the preferred embodiment of the present invention, examples of which are illustrated in the accompanying drawings.

Figure 1:
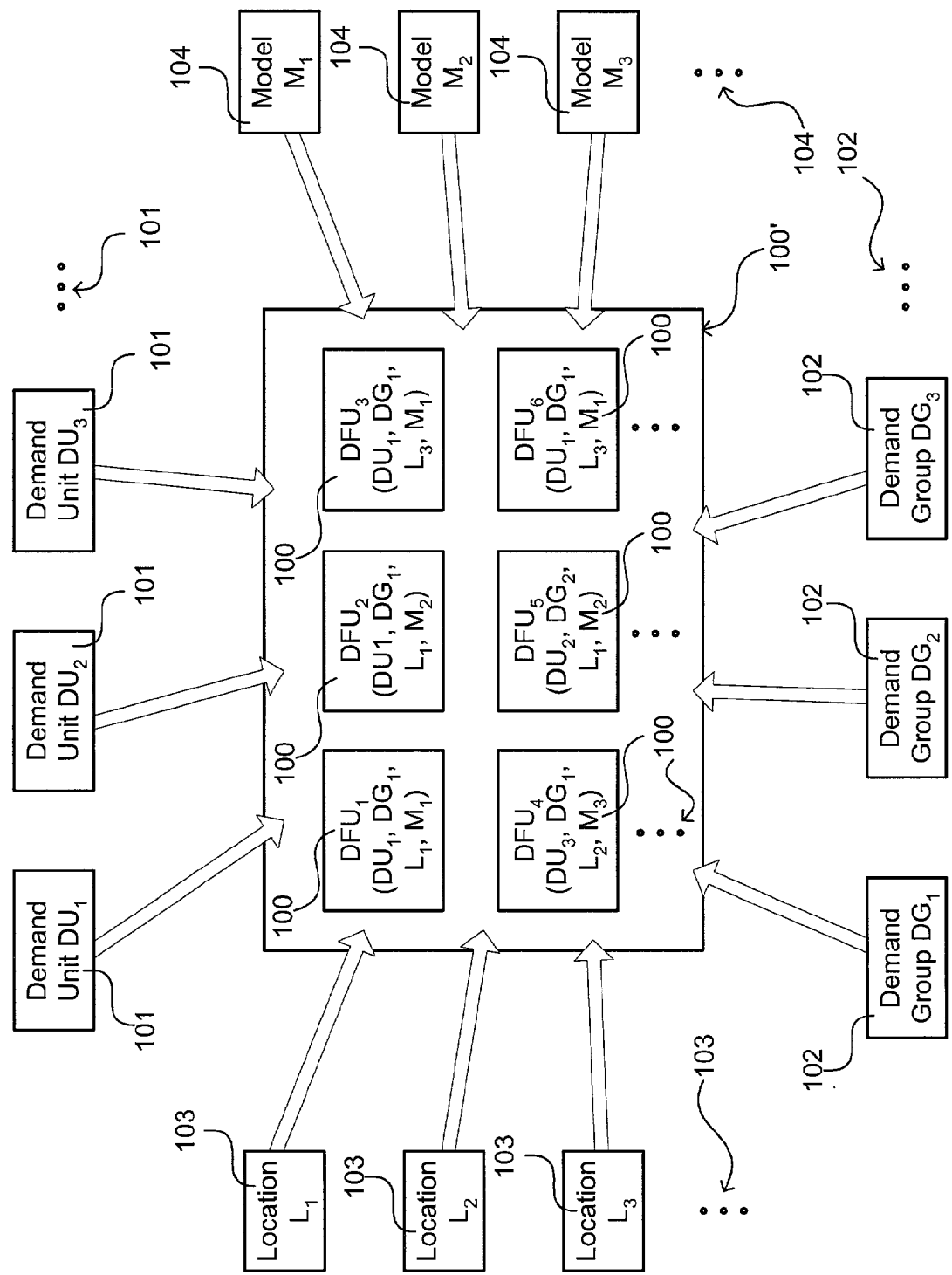
FIG. 1 is a schematic diagram depicting how demand forecasts can be organized by demand forecasting units according to the present invention.

Generally for a given seller organization that operates as a seller or supplier, demand forecasting must be performed on a recurring basis for each item in each market. Since the demand for an item varies according to the market and time frame in which it is selling, demand forecasts according to the present invention are identified according to its demand forecasting unit ("DFU"). As depicted in FIG. 1, a DFU 100 according to the present invention is a mechanism for categorizing each demand forecast according to four primary types of information. Each DFU 100 categorizes a forecast according to one of a plurality of a demand units 101, one of a plurality of demand groups 102, one of a plurality of locations 103, and one of a plurality of models 104. A demand unit is a unique product identifier code that functions in a manner similar to an item number or catalog number (i.e., it identifies the particular product to which that DFU's forecast will apply). Demand groups are categories into which demand units fall and which are used for forecasting purposes. A demand group, for example, might be a key account, a brand, a customer grouping or demographic, a vendor type, or a market zone. Therefore, each DFU contains a demand unit and a demand group into which the demand unit is further classified with other related demand units. Additionally, for each DFU a location is specified which represents the geographic region to which a particular forecast will apply. Typically, the DFU location is specified at the market level and does not take distribution centers into consideration for a particular forecast. Finally, the model specified for each DFU defines the combination of history stream and forecast algorithm that will be used to create forecast for that particular DFU. This history stream and forecast algorithm combination, as will be understood further after reading the discussion of FIG. 2 below, defines the statistical model that a particular user selects to create demand forecasts.

The use of DFUs to categorize and organize forecasts according to preferred embodiments of the present invention allows users to correlate and associate related forecasts for a particular product (demand unit), for particular products within a given product category (demand group), for like products being sold to a particular type of customer (demand group), for a product or like products within a given market (location), or for a particular product within a particular market wherein different a forecast algorithm and history stream combination (model) is employed. As shown in FIG. 1, a given DFU in the field 100' of DFUs defined by the user, for example, may have a demand unit $DU_1$ of "080-16" (a product number), a demand group $DG_1$ of "retail stores" (a channel), a location $L_1$ of "South West U.S." (a market region), and a model $M_1$ of "point-of-sale/proprietary" (a demand history/algorithm combination). A second DFU could also be comprised of $DU_1$, $DG_1$ and $L_1$ but instead have a model $M_2$ of "point-of-sale/Fourier" and therefore would produce different statistical forecasts. Such DFUs that differ only with respect to model (either by history, algorithm, or both) are referred to herein as "model variants."

Figure 2:
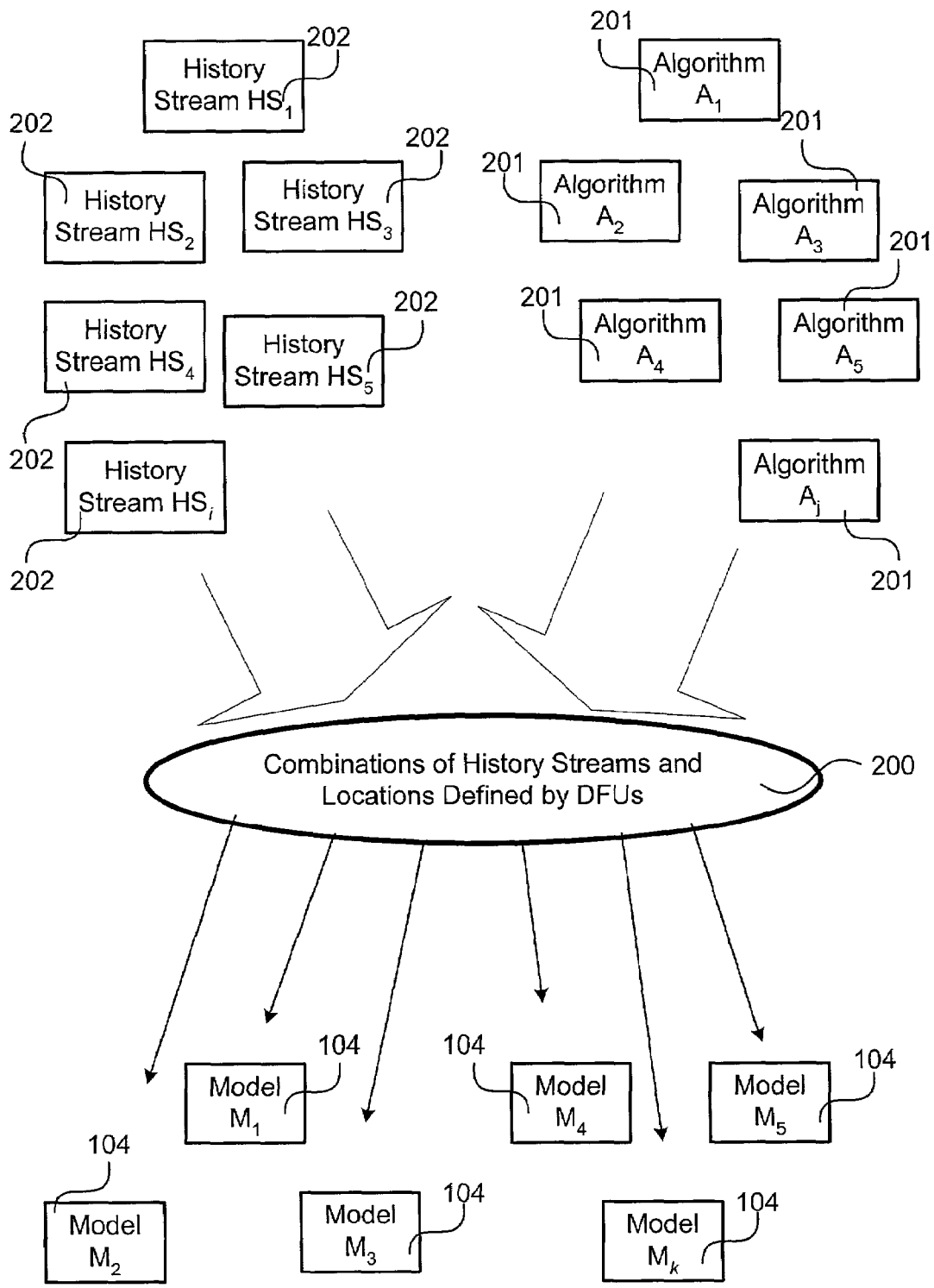
FIG. 2 is a schematic diagram depicting how alternative forecasting algorithms and various history streams of demand data can be combined according to embodiments of the present invention to create a multiple model framework.

Referring now to FIG. 2, there is depicted a schematic diagram that demonstrates how, for a given demand unit, alternative forecasting algorithms 201 and various history streams 202 of demand data can be combined by user defined DFU parameters 200 according to the present invention to create a plurality of models 104. As will be readily appreciated by one skilled in the art, the ability to make various combinations of available history streams of demand data and forecasting algorithms as depicted in FIG. 2, in conjunction with the ability to recognize and associate model variants, according to embodiments of the present invention facilitates the comparison of alternative demand forecasts that take into account different demand drivers, product life cycle projections, and the like. The ability to identify a preferred model for making demand forecasts is thus made easier.

Similar to model variants, DFUs that differ only with respect to locations are referred to herein as "location variants." As will be readily appreciated by one skilled in the art, demand at different locations can often be sufficiently parallel (such as for established products in separate and distant, yet similar, cities) such that the accuracy of a forecast for one DFU can be assessed by comparing the forecast with existing forecasts for its location variants.

Thus, due to the multiple model framework ("MMF") employed by the present invention, DFU model variants can have multiple types of history and multiple forecast algorithms combined to form several alternative models for a given product. In this manner, forecasts for DFUs which are model variants of one another can thereby be created for comparison and eventual adoption of the best model as described below.

Additionally, a judgement forecast (as defined and described below) for a first demand unit can be made taking into account the statistical forecast created for a second demand unit in the same demand group (i.e., such as in the case of similar products within the same product category). This aspect of the invention is especially useful in situations whereby a first product does not have a significant amount of demand history data and is similar enough that the user can expect the second product to have behave in a manner similar to how the first product is forecasted to behave.

The present invention recognizes that there are often several different areas from which forecast information is obtained. To this end, the multiple model framework ("MMF") the present invention can be employed to support collaborative and comparative forecasting. Such collaborative and comparative forecasting as described herein can occur both internally within a single organization as well as externally across an extended supply chain community consisting of many business partners. By employing MMF functionality, the present invention enables multiple-scenario comparisons and analysis by letting users create forecasts from multiple history streams (for example, shipments data, point-of-sale data, customer order data, return data, etc., originating from various sources) using various alternative forecast algorithm theories.

As will be readily appreciated by one of ordinary skill in the art, there are various well known and proprietary statistical algorithms that can be used alternatively in particular circumstances to predict future demand based upon historical data. The MMF of the present invention enables users to compare statistical algorithms paired with various history streams (collectively referred to as "models") so as to run various simulations and evaluate which model will provide the best forecast for a particular product in a given market. Once the user has decided upon which model it will use, it can publish forecast information provided by that model for use by its organization (such as, for example, by a downstream supply-planning program or shipping managers).

In preferred embodiments of the present invention, by employing the MMF organizations can import forecast values from various external groups or other parts of their organizations such as, for example, already completed sales or marketing estimates, to compare to with forecasts produced by statistical models is systems of the present invention. In this manner, statistical forecasts produced by a system or method of the present invention can be compared with external judgement forecasts to help users refine models and make forecast publication decisions accordingly.

To generate a particular forecast, the present invention provides organizations with the ability to calculate a variety of forecasts according to alternative models and then select the results of a particular forecast model that they feel is most accurate and would like to submit (or "publish") for subsequent supply planning. Algorithms as utilized in the MMF are composed of a series of mathematical calculations that are executed based upon history stream data in order to create a statistical forecast. Preferred embodiments of the present invention enable users to achieve a balance between strictly statistical forecasts and judgement forecasts by controlling the use of history data. Statistical forecasts assume that products generate stable demand. As such, statistical forecasts are typically more useful to reflect the characteristics of mature products that are produced and maintain long life cycles with many customers. These forecasts rely upon a base history (i.e., history not containing such anomalous or unusual data points) for predictable and repeatable demand.

On the other hand, judgement forecasts focus strongly on human estimates of unstable demand. Such forecasts are most useful with new products that are highly promoted, those products that have few customers, those that are fairly new, and/or those that have a short life cycle. Judgement forecasts are used for special events and non-repeatable occurrences and typically rely upon non-base history streams.

Figure 3:
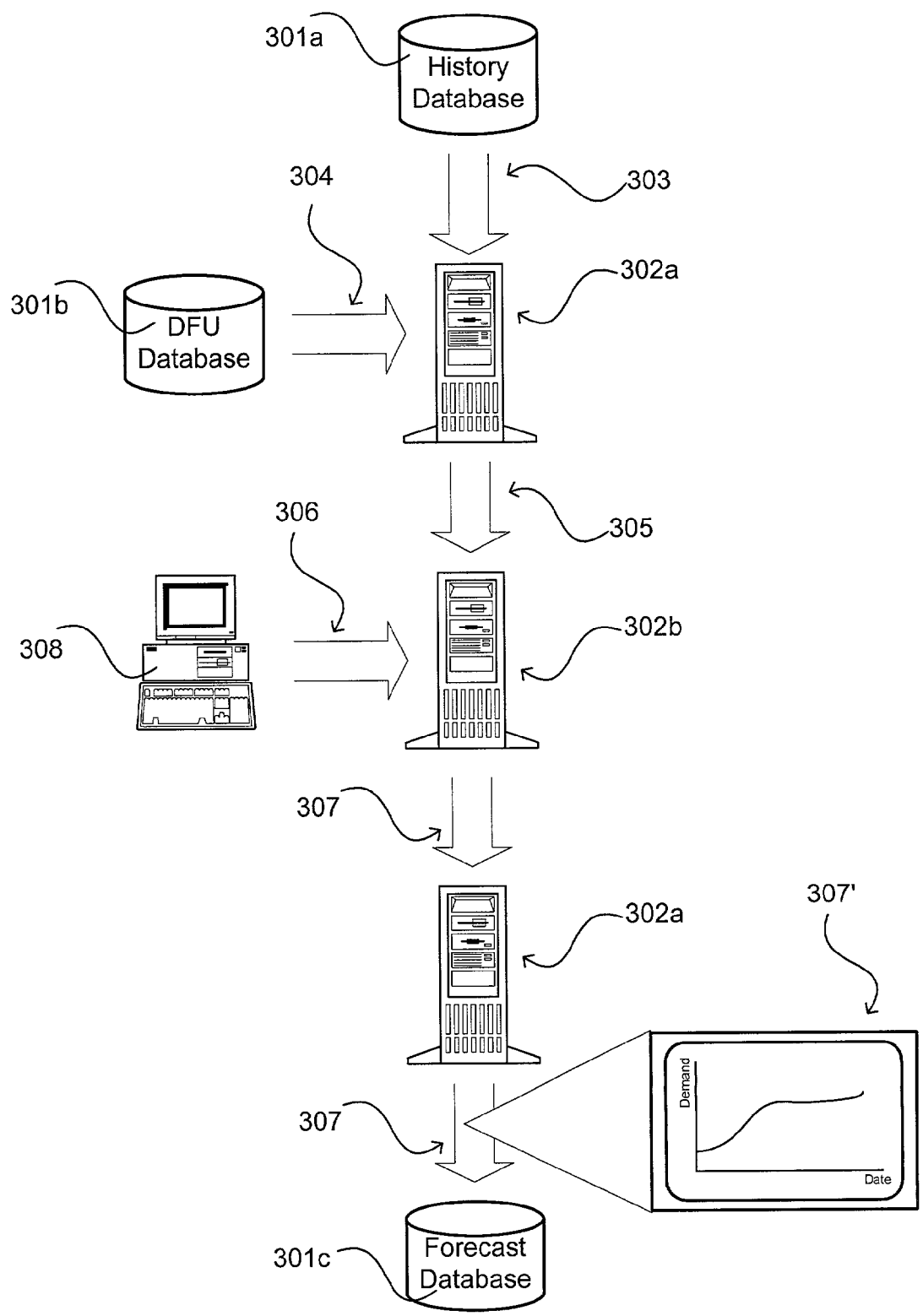
FIG. 3 is a combination schematic and flow diagram depicting how the logic whereby the demand forecasting system of the present invention creates a forecast for a given demand forecasting unit from a history stream and user inputted causal factors according to embodiments of the present invention.

Referring to FIG. 3, there is depicted how a forecast 308 is created for a given DFU from appropriate demand data present in various history streams 303 and inputted future causal factor information 306 according to the demand forecasting systems and methods of the present invention. Initially, various demand data history streams are stored in a database like the history database 301a depicted in FIG. 3. Obviously, the functions for databases 301a–301c in FIG. 3 alternatively can be performed by a single database, but, however, separate databases are depicted in FIG. 3 to more clearly depict the flows of data. Using DFU data 304 (demand unit, demand group, location and model) retrieved from a DFU database, a database server 302a retrieves history streams 303 that contain demand data relevant to the DFU from the history database 301a. This DFU and appropriate demand data history streams relevant to the DFU are passed 305 to a forecast generation server 302b (like databases 301a–301c, servers 302a–302b alternatively can be combined into a single server). Forecast generation server 302b uses the forecast and DFU data 305 and causal factor inputs 306 from a user (such as through an input device like personal computer 308) to produce a demand forecast 307 for the DFU. This demand forecast is sent to the database server 302a where it is then stored in a forecast database 301c. Plot 307' provides a graphical example regarding how the demand forecast 307 could appear to a user.

When choosing the appropriate statistical algorithm to associate with a particular DFU history stream (i.e., combine them to create a model) according to the present invention, the appropriate algorithm should preferably be chosen based upon the characteristics of the underlying product. For example, Table 1 below illustrates how a particular product's life cycle or characteristics can have a strong influence upon its demand patterns.

TABLE 1

| Product Type | Phase in Life Cycle | Characteristic Sales Pattern |
|---|---|---|
| Halloween Candy | Mature Product | Predictable Seasonal Peaks |
| Spare Parts For New Automobiles | Newly Introduced Product | Sporadic Demand |
| Computer Processor Chips | Growth or Decline | Fast growth followed by sharp decline |
| Snow Shovels | Mature Product | Irregular Seasonal Peaks |

According to preferred embodiments of the present invention, the demand planning system supports a combination of both well-known traditional algorithms and proprietary algorithms.

Figure 4A:
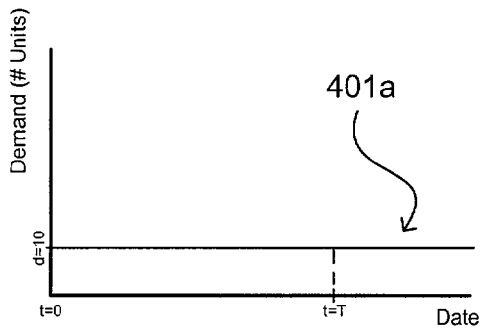
FIGS. 4A, 4B, 4C and 4D are two-dimensional plots depicting the difference between forecasts that progressively take into account level, trend, seasonal effects, and casual factors.

FIGS. 4A, 4B, 4C and 4D are two-dimensional plots 400a–400d depicting the difference between forecasts 401a–401d that progressively take into account level, trend, seasonal effects, and casual factors. As shown in FIG. 4A, the demand forecast 401a depicted represents a forecast that predicts only the future level of demand. In essence, forecast 401a is solely an average of past demand history data and does not take into account trends in demand, seasonal effects and causal factors. Under normal circumstances, the only time such a forecast would be useful is if past demand is "lumpy" or random such that no pattern can be deduced. Forecast 401a by far represents the most simplistic type of demand forecast that can be produced from demand history data. More complex statistical forecasts also take into account the trend of demand, as the forecast 401b presented in FIG. 4B demonstrates. While forecast 401b is a linear forecast that takes into account demand trend (in the case illustrated, a linear tendency for demand to increase at a given rate), it will be readily appreciated by one of ordinary skill in the art that forecasts which utilize the trend concept can be of other forms including quadratic and logarithmic.

Additionally, even further advanced demand forecasting algorithms take into account seasonal effects. Such seasonal forecasts, such as forecast 401c of FIG. 4C, predict peaks and valleys in demand to help model past recurring periods of high and low demand into the future. The seasonal effects that can lead to such high and low periods of demand typically vary from market to market and product to product. Finally, the plot of FIG. 4D demonstrates the effect a causal factor (such as sale price discounting) can have on a forecast otherwise based solely upon level, trend and seasonal effects such as forecast 401c of FIG. 4C. For example, conventional economic theory dictates that one would expect that demand for a given product would increase with a decrease in price (all other things being equal). Other causal factors besides price changes would likewise have similar impacts upon expected demand. The quantification of the effect of causal factors into forecasting algorithms to more accurately predict the future demand for a product is thus attempted in many of the more sophisticated forecasting algorithms. The ability of the present invention to provide alternative forecasting models created using various forecasting algorithms in essence advantageously allows users to use their business judgement and experience to take into account level, trend, seasonal effects and causal factors identified from past demand data to various extents to achieve the most accurate forecast possible given the demand history data available.

The task of creating and maintaining a statistical model to be associated with a particular DFU must take into account two basic elements in order to provide realistic statistical forecasts; it must take into account historical data to generate the statistical algorithm, and must project historical demand patterns into the future. Many statistical algorithms are based on Fourier series (due to the cyclical nature of the Fourier series) and contain customized sets of coefficients (determined from past historical data) that are intended to project demand for a given product into the future. Additionally, multiple linear regression ("MLR") is also used in statistical algorithms to calculate forecasts for products that have multiple external factors (causal factors) such as price, weather, or demographics which influence the selling patterns (i.e., demand) of products.

Figure 4B:
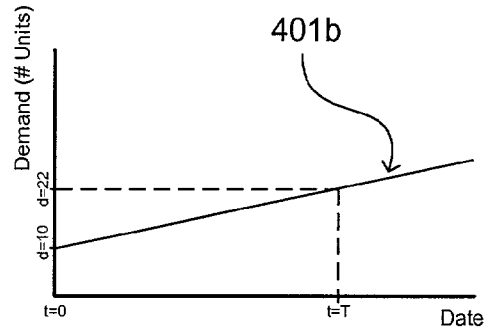
Figure 4C:
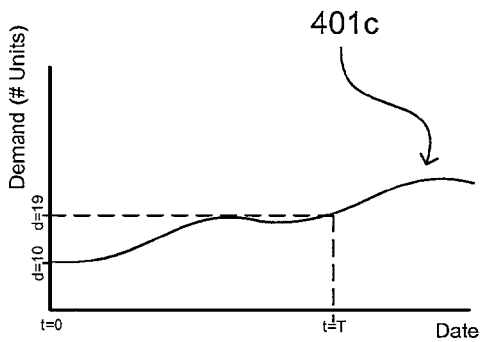
Figure 4D:
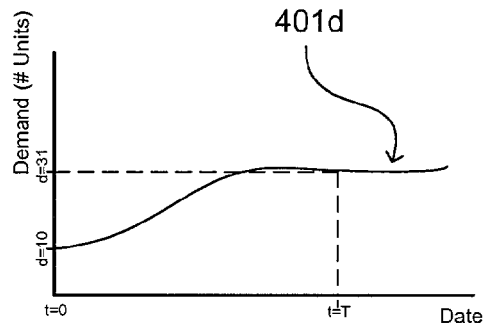

By way of example, it is known in the art of statistical demand forecasting to utilize Fourier series to model the demand cycle of stable products that have either constant demand or demand that changes at a predictable constant and/or periodic rate. Fourier series operate by fitting sine and cosine waves with increasing frequencies and phase angles into a time series. The first coefficient in a Fourier series when used for demand planning represents the overall level (or mean) of demand (a forecast 401a taking into account mean only is depicted in FIG. 4A). The second coefficient represents trend (or slope) which models the number of units by which the level is changing (increasing or decreasing) within each time period (a forecast 401b taking into account mean and trend is depicted in FIG. 4B). The remaining Fourier coefficients (present in pairs) represent seasonal patterns (peaks and valleys) in the demand history (a forecast 401c taking into account mean, trend and seasonal effects is depicted in FIG. 4C). Understandably, predictable seasonal patterns in demand history can be very accurately modeled by sine and cosine waves. Thus, Fourier type demand planning algorithms typically produce the best results when 2 to 3 years of demand history are used to generate the model coefficients (although the algorithm, of course, can create a forecast based upon only a few history points) for a product type in point of its life cycle that demonstrates large seasonal effects upon demand. Thus, demand forecasting algorithms based upon Fourier series in essence allow companies to produce forecasts that take into account seasonal effects.

Additionally, statistical forecasting algorithms derived from MLR of demand causal factors are also used in industry. MLR extends the Fourier approach by integrating one or more causal factors (that is, external demand driving independent variables like price, weather, demographics, and other known economic indicators) into a trend or cyclical forecast to help predict the influence of such causal factors upon the selling patterns of particular products. MLR-based algorithms can be best applied when there are multiple known external factors that have a significant impact upon sales or demand. Often times, product price and advertising efforts are particularly strong causal factors. Thus, MLR utilizes level, trend, and seasonal effect predictors like the Fourier approach but also integrates independent variable causal factors and event data into the forecast. As evidenced by a comparison of forecasts 401c and 401d in FIGS. 4C and 4D, causal factors have an additive (positive or negative) effect on the Fourier base demand (given by the mean, trend and seasonal effects).

Figure 5:
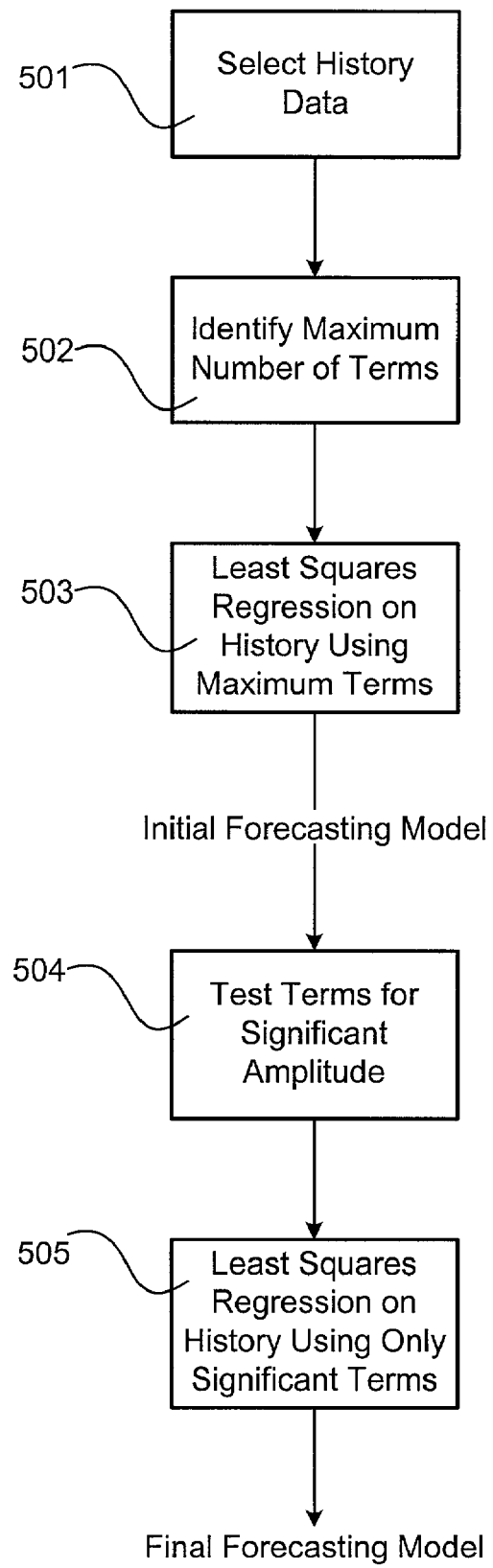
FIG. 5 is a flow diagram depicting the manner by which the various coefficients for a forecasting algorithm are generated according to preferred embodiments of the present invention.

FIG. 5 is a flow diagram depicting the process 500 by which the various coefficients for a forecasting algorithm are generated according to preferred embodiments of the present invention. As shown, first the appropriate history data is identified at step 501 (such as by the model definition for the particular DFU in question). At this point, the system identifies a maximum number of terms (model coefficients) to attempt to solve for at step 503. This maximum number of terms could be a system-set default value (for example, to place an upper limit on the amount of calculating capacity used) or a guess by the user based upon the amount of seasonal peaks or causal factors he or she believes have been observed in the demand history data. Experience has shown that according to preferred embodiments of the present invention that optimal performance of process 500 will typically be achieved if the maximum number of terms for a weekly forecast is set at less than or equal to 12 and for a monthly forecast is set at less than or equal to 52.

Once the maximum number of terms and the history data is selected, a least squares regression is performed on the history as is known in the art of statistical analysis at step 503. At step 503, the process 500 attempts to find the coefficients of the forecasting algorithm in question that produces a minimum squared error. In essence, step 503 of process 500 will attempt to fit the best model forecast to the data using the maximum number of terms allowed.

At this point, an initial forecasting model is produced. At step 504, process 500 performs a significant amplitude test to determine how many seasonal effect terms (an amount less than or equal to the maximum amount of terms set at step 502) should be included in the final model. Starting with the peak or valley (i.e., sine wave) with the smallest amplitude, step 504 progressively eliminates the smallest peak or valley coefficient until it finds the smallest amplitude peak or valley that still meets an amplitude significance test (such as exceeding a minimum percentage effect on base, i.e., level and trend, demand or by exceeding a threshold related to a value reflecting the amount of error in the model). As soon as the first peak or valley that has significant amplitude is found, the system stops checking and concludes that the remaining peak and valley coefficients represent the right amount of seasonal effects for the model. Thus, the value of the significant amplitude test factor can make it more or less likely for the process 500 to include many seasonal waves in the final forecasting model.

At step 505, a second least squares regression is performed on the history data selected at step 501. In this regression, however, the process 500 assumes the appropriate amount of seasonal effect terms is represented by the amount of peaks and valleys found to have significant amplitude at step 504. The least squares regression of step 505 thereby produces a final forecasting model.

As will be readily appreciated by one of ordinary skill in the art, a user can calculate a demand forecast employing an MLR algorithm by including only those variables that have a significant impact upon demand or alternatively by employing many causal factors. In either case, MLR-based algorithms automatically calculate the effect of each individual causal factor on sales (such as by calculating the T-statistics and associated P-values for each of the coefficients). In calculating these effects, the MLR model uses future causal factors data such as, for example, a proposed change in price.

Further, proprietary demand planning and forecasting algorithms are available that assume that business is not constant. Such proprietary algorithms are useful to model products with sporadic demand short life cycles, such as, for example, computer hardware. The present invention is adapted to utilize one or more of such proprietary models that have been or will be developed to forecast such sporadic product life cycles.

By way of example, according to the Fourier and MLR algorithms employed in embodiments of the present invention, the forecasting models derived therefrom can be generically described according to the equation $$F = DM + S + CF + JF \quad (\text{Eq. 1})$$

wherein the 'F' is the forecast, 'DM' is the dynamic mean which comprises the level and trend portions of the forecast, 'S' is the total of the seasonal effect portion, 'CF' is the total of the causal factor portion, and 'JF' comprises the total of the judgment forecast portion. Typically, the DM and S portions of the forecast F would be automatically derived according to a Fourier-based approach to modeling while the CF portion would be automatically derived according to an MLR approach. The JF portion is manually entered by the user. For example, a user could expect that recent positive press write-ups would provide a positive effect on future demand in the near term and thus could manually introduce a positive JF portion to a given forecast to account therefor. Alternatively, of course, each portion may be manually specified by the user. The forecast F for a model thereby is the summation of the dynamic mean DM with the seasonal effects portion S (if any), with the causal factor portion CF (if any), and with the judgment forecast JF portion (if any).

For the Fourier (i.e., seasonal) derived components of a forecast model, the S portion may be comprised of one or more seasonal effects (i.e, expected recurring peaks and valleys in demand). The statistical regression as described above, using the appropriately segmented history data streams, calculates a series of seasonal effect coefficients of automatically such that for time index 't' according to the equation:

$$S_t = sa_1 * \cos(\omega p_t) + sa_2 * \sin(\omega p_t) + \\ sa_3 * \cos(2\omega p_t) + sa_4 * \sin(2\omega p_t) + \ldots \quad (\text{Eq. 2})$$

where '$sa_i$' is the seasonal amplitude coefficient calculated for the particular sine or cosine wave (amplitude being the measure of the magnitude of a seasonal pattern), 'ω' is the fundamental frequency equal to $2\pi/P$ where 'P' is the number of periods taken into account, and '$p_t$' is the period index. Due to the periodic nature of Fourier modeling, sine and cosine elements will always appear in pairs such that the total number of amplitude coefficients calculated by statistical regression must be an even number.

For the MLR algorithm derived components of a forecast model, the CF portion may be comprised of one or more causal factor variables ("CVs") while related to, for example, price, weather and demographics. The statistical regression techniques as described above, using the appropriately segmented history data streams, calculates one or more causal factor variable coefficients automatically such that $$CF = CV_1 * CVC_1 + CV_2 * CVC_2 + \quad \text{(Eq. 3)}$$

where '$CVC_i$' is the causal factor coefficient calculated for causal factor variable '$CV_i$.'

Mathematically, to generate an MLR-based model, the present invention solves the following linear model for each causal factor identified by the user:

$$H = \beta_0 + CVC_1 X_1 + \epsilon \quad \text{(Eq. 4)}$$

where 'H' is the history containing non-base evidence of the causal factors impact upon demand, $\beta_0$ is the level (intercept) to be calculated by the system from the history, $X_1$ is the causal factor value inputs evidenced in the history input by the user, $CVC_1$ (the coefficient as defined above) is calculated by the system from the history representing the proportional effect of a given causal factor value, and $\epsilon$ is the system calculated measure of error. Necessarily, in performing the statistical regression, it is desired to calculate values for $CVC_i$ and $\beta_0$ that minimize the value of $\epsilon$. Once $CVC_1$ is calculated for each causal factor variable $CV_i$, then Equation 3 can be utilized to calculate the CF for user-defined future values of $CV_i$.

As will be readily appreciated by one of ordinary skill in the art, once causal factors for the demand of a particular DFU have been identified, the historical and anticipated future values (for example, a planned price discount for a particular demand unit) of those causal factors must be inputted by a user and stored in the system, such as in a database for use by the demand forecasting system in creating a forecast with a model that uses causal factors.

Once a MLR forecast has been generated and the forecast has been compared with actual demand the present invention enables users to fine-tune to coefficients of the MLR forecasting algorithms. For current history points that are anomalies (excessively high or low and will not be repeated in the future), demand planners can mask specific history points that are to be excluded from the model.

In preferred embodiments of the present invention, users can be prompted to create causal factor types when establishing history streams for DFUs that are going to use MLR algorithms for modeling. A causal factor type usually represents a category or grouping of causal factors in order to aggregate data points. For example, holidays or price changes can serve as causal factor types. Once causal factor types have been created, the user can be prompted to define individual causal factors that may be present within the history streams. For example, all holidays used as causal factors can share the same causal factor type of "holiday". However, two separate holidays, such as Christmas and Easter, will have individual history streams that are related to the historical demand changes that occur whenever the causal factor occurs.

For any causal factors that are included in a forecast algorithm calculation, the coefficient values and statistical values (such as T-statistics) will be stored and associated with the causal factor history. As is known in the art of statistical analysis, the T-statistic is used to measure the significance of an individual variable upon the result of a multivariable function. Generally speaking, a variable (causal factor) has a significant impact upon the value of the function (forecasted demand) if the T-statistic is equal to or greater than two, or equal to or less than negative two.

Figure 6:
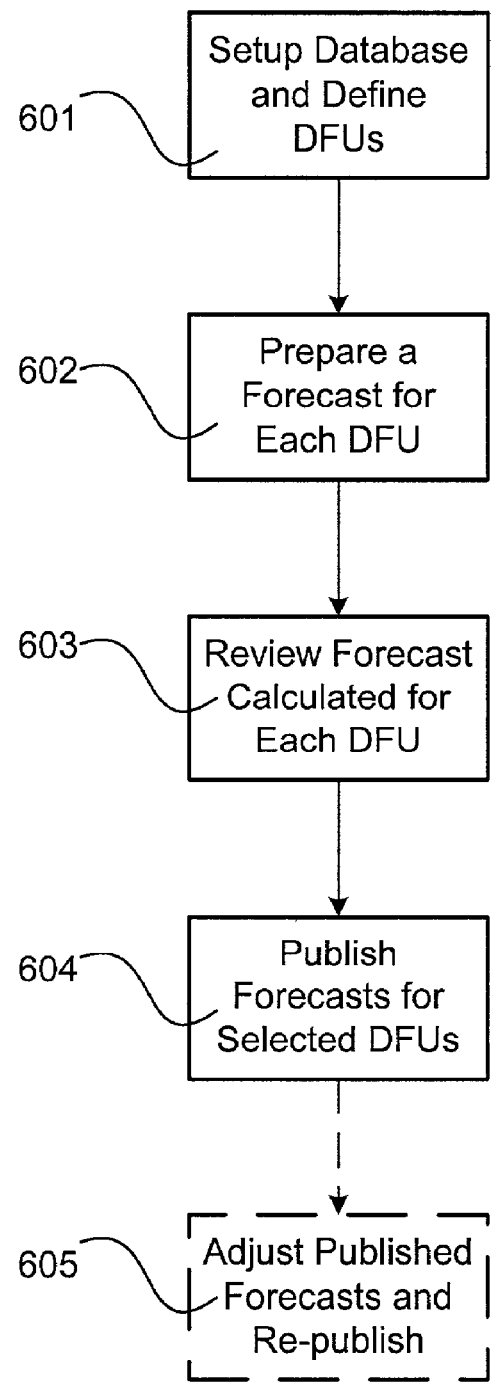
FIG. 6 is a flow diagram depicting the overall process steps performed to produce a demand forecast including preparing for and performing a demand planning cycle according to embodiments of the present invention.

Referring to FIG. 6, it is shown that the demand planning process 600 according to preferred embodiments of the present invention includes five basic procedures. Typically, a user would perform these five procedures on a recurring basis whenever a new set of demand forecasts is desired or necessary. As shown in FIG. 6, at step 601, the user sets up the demand forecasting environment by identifying and arranging demand history data stream feeds from various internal and external sources, defining DFUs by associating demand units and demand groups with locations and models, and initializing various databases (such as history, DFU, and forecast databases) for storing relevant information entered into and produced by the demand planning system. In this first step, the user also selects particular DFUs for which he or she desires to create forecasts. Understandably, the number of DFUs selected at step 601 can range from a single DFU, through a group of DFUs (such as those having identical demand groups or being model or location variants) up to and including all currently defined DFUs.

Whenever products are added to or removed from the user's organization's offerings, the corresponding DFU information must be added, edited or removed from the DFU database. Thus, also at step 601, DFUs and their constituent parts are continuously updated, modified or deleted to reflect such product changes. Such changes to the DFUs are stored in the appropriate databases such that they then are reflected in subsequent runs of the demand planning process 600.

As shown by the figure, step 602 immediately follows step 601 and entails preparing a forecast for each DFU selected in step 601. Step 602 essentially comprises the performance of a set of procedures for generating a demand forecast; this set of procedures comprises a forecast generation cycle that will be disclosed in more detail by the discussion of FIG. 7 and its steps 701–707 below. The completion of step 602 provides the user and the demand forecasting systems according to the present invention with a separate demand forecast for each DFU selected at step 601.

Figure 7:
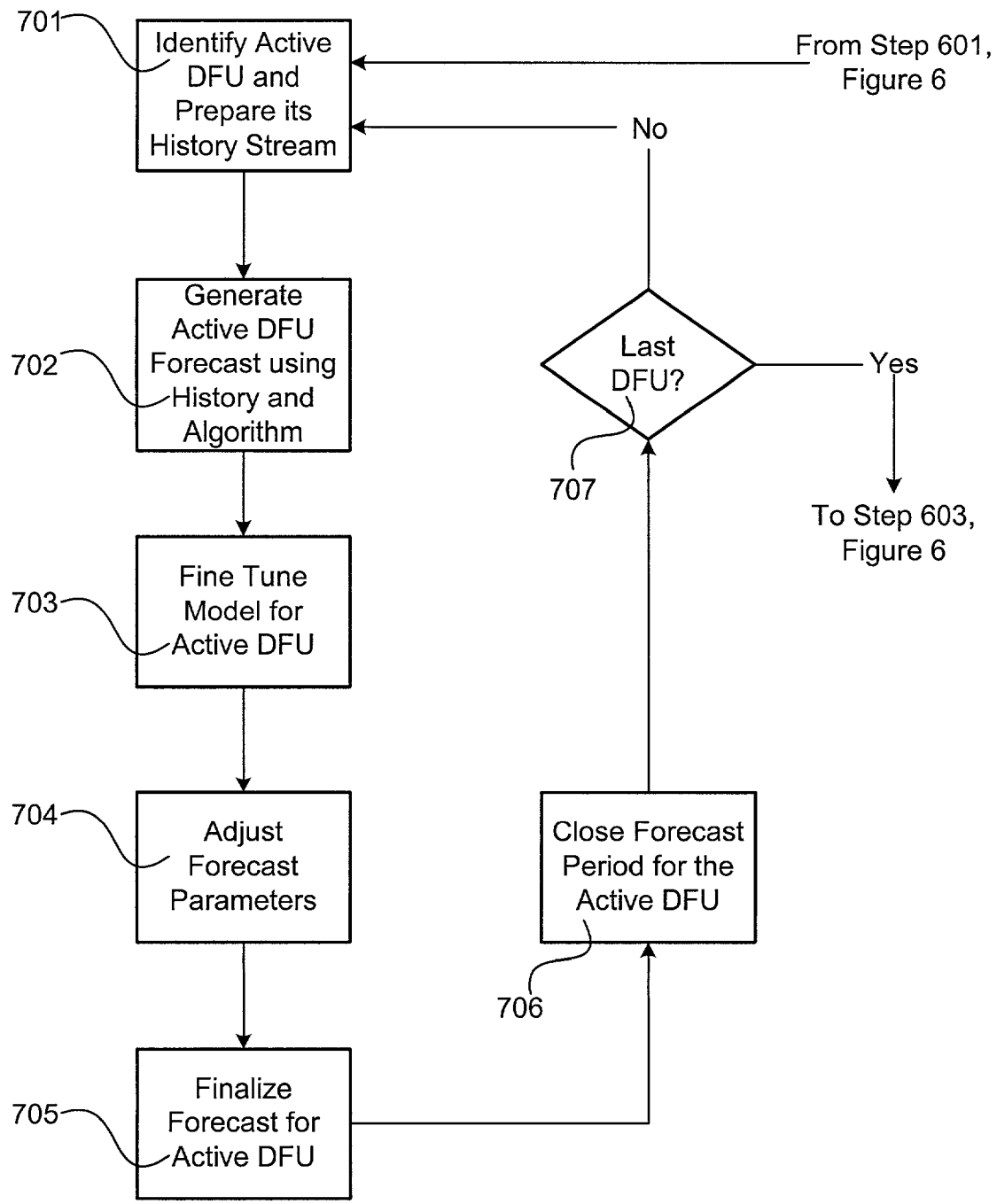
FIG. 7 is a flow diagram depicting a process for producing a forecast for each of a plurality of demand forecasting units according to preferred embodiments of the present invention.

Referring now to FIG. 7, there is presented a flow diagram that depicts step 602 in more detail. As shown by FIG. 7, steps 701–707 are repeated for each "active" DFU (i.e., DFUs that are having new forecasts created by process 600). Each cycle of steps 701–707, a user prepares and maintains history data at step 701. Demand history data stored according to the present invention at step 701 includes, for example, streams of shipment, order, and/or point-of-sale demand data for each DFU as well as related information including past promotions, price changes and unusual events. The demand planning system according to the present invention stores such demand history data in a history database. Generally, demand history data can be broken into two types: base and non-base. Base history is demand data that is predictable and repeatable. Conversely, non-base history is that part of demand that is due to special events, such as promotions or extreme market circumstances. As such, non-base history is generally comprised of that portion of impacts upon past demand that are not anticipated to repeat themselves from one year to the next or otherwise in a periodic manner. However, non-base history is still stored within the history database to help users forecast the impact of special events upon future demand (as well as to identify and model the impacts of causal factors as described above with respect to FIGS. 3 and 5). The demand forecasting process 600 uses only base history to develop and fine-tune the level, trend and seasonal aspects of a particular model. Non-base history is only used on a case by case basis to help predict the impact upon demand that will be caused by contemplated or anticipated special events in the form of causal factors. At step 701, the base and non-base history data is appropriately segregated.

As will be readily appreciated by one of ordinary skill in the art, demand history data often includes data points (such as spikes or valleys in demand) that can cause problems if they are included within calculations to predict future demand. Examples of such problematic data include variation in demand caused by unusual market conditions, decreases in demand due to obsolete or superseded products, general data errors, and the inability of the user to distinguish between base and non-base data. In order to account for such problematic data in base or non-base history, at step 701, the user is provided the opportunity to adjust history to overcome such problems. Mechanisms by which a user can adjust history data include manually editing extremely high or low values, controlling the time period of the relative history used to ignore periods of sporadic and/or otherwise unreliable history, and masking specific periods of unreliable and/or sporadic history.

Once the relevant histories have been prepared and maintained at step 701, demand forecasting systems that utilize process 600 according to the present invention generate forecasts at step 702 (as described in detail by FIG. 3) using the particular statistical forecasting algorithm associated with that history by the active DFU. To generate a new model for demand forecasting, a user at step 103 attempts to determine relevant coefficients for the particular demand forecasting algorithm derived from the pattern of past demand as evidenced by the appropriate history. The determination of such coefficients is performed using known and accepted statistical regression methodologies as described above with respect to FIGS. 3 and 5. At this point, an initial forecast is provided for review by the user.

In some preferred embodiments of the present invention, when models are created at step 702 the process 600 utilizes an automatic tuner when generating the model from the associated algorithm and demand history data. The automatic tuner is an iterative algorithm that, when activated by the user, identifies forecast model error helps to improve the quality of future demand forecasts. The automatic tuner performs an evaluation of the model prepared in step 702 (before passing to step 703) that attempts to identify an optimal model based upon two factors; model fit (the amount of error between the forecasted demand and the actual demand) and feasibility. The model's coefficients that have the best model fit but that still also satisfy the feasibility analysis is considered the optimal model according to the present invention. When determining error, the present invention can utilize any known and accepted statistical measurement of error including mean absolute deviation, mean squared error, smoothed mean squared error, root mean squared error, and root mean absolute deviation. In determining whether changes to a forecast algorithm coefficient proposed by the auto-tuner is feasible, present invention utilizes a fuzzy logic that evaluates and balances indicators of the following five attributes: smoothness of the dynamic mean, stability of the seasonal profile, distribution of positive and negative errors, forecast explosion, and continuity of the fitted forecast error during the most recent periods. By way of example, demand more often than not tends to be smooth rather than volatile. Thus, the auto-tuner attempts to prevent causal factors from making forecasted demand overly reactive. Additionally, by way of further example, more often than not demand does not experience extreme increases or decreases (explosions). In this manner, the fuzzy logic compares how changes in causal factors effects the five fuzzy logic factors as a whole. The automatic tuner thereby reviews the model generated by the statistical regressions and makes certain that the model produced is feasible on top of providing a good fit with the history data.

After an initial forecast has been produced at step 702, the demand forecasting process 600 of the present invention at step 703 enables users to leverage their knowledge of their organization in order to fine-tune their particular model. While fine-tuning, users can introduce and/or discontinue products, limit history to a particular time period, adjust individual parameters where coefficients manually, mask certain history points or periods, or manually edit base level or trend coefficients.

For example, if a user knows that a change in the demand pattern occurred at a certain point in history (i.e., following a large and successful advertising campaign), he or she might desire to develop a model based only upon demand history subsequent to that change. Additionally, the users may decide to fine-tune parameters of a statistically model manually by, for example, instructing the system to weigh the most recent history data with more impact in determining coefficients of the model than older history data. Further, after reviewing the initial forecast, the user can modify the model by revising the history (in a manner similar to that discussed above with respect to step 701) such as by masking irregular data periods. In this manner, a "fine-tuned" initial forecast is created and passed on to step 704.

At step 704, the system proceeds to adjust the statistical forecast produced by a particular model such that the forecast takes into account planned marketing strategies, competitive events, judgment-based forecast effects, or occasional one time occurrences. Such unusual occurrences come in the form of both external and internal events. An external event is a planned strategy designed by the user or its organization to stimulate demand. Additionally, external events can include the introduction of a new product by a competitor, or anticipated cannibalization of market by new products. An eternal event is a business condition such as a promotion, deal, or new product introduction. Additionally, such unusual occurrences can also include overrides that effect catastrophic situations (hurricanes, blizzards) and shifts in the market place.

For example, if the user knew that the organization desired to offer a promotion, such as a customer price rebate, for the active DFU and if the forecast model generated at step 702 had utilized relevant non-base history to account for the impact of customer rebates by introducing an appropriate causal factor, the user would be able to input various values for the causal factor (i.e., $5 rebate, $10 rebate, etc.) into the demand planning system. The system would then allow the user to view the impact that the various values of the causal factor has upon forecasted demand (such as by side by side graphical displays or otherwise). Once the user has decided upon a particular value for all the causal factors employed in the active DFU's model step 704 is complete.

After the forecast has been adjusted to account for such unusual occurrences at step 704, the DFU forecast is finalized at step 705. This finalized forecast is stored in the forecast database and is thereby made available to the user for comparison with finalized forecasts for other DFUs at step 603 in FIG. 6.

After the forecast is finalized and stored in the database at step 705, the demand forecasting process comes to a close for the active DFU. At step 706, the demand forecasting system of the present invention stores historical forecast data, stores forecast performance data, and initializes the database to store updates of demand histories as new data streams are obtained such that this new data can be used in future runs of process 600 or optionally later in the current demand forecasting process 600 at step 605 as will be described below.

By storing the forecast data at the end of each demand forecasting cycle for a particular DFU, the demand forecasting system of the present invention builds a history of forecast and model data that it can then use, together with actual demand, to track performances of individual models over a time period. This forecast performance data can be used to provide feedback to the forecasting process and help to improve its accuracy. Additionally, to maintain and evaluate demand forecasts that are current, the system continuously updates relevant DFU histories with actual demand data.

As shown by FIG. 7, steps 701–706 are repeated for each DFU selected in step 601 until it a finalized forecast has been prepared for each and the last DFU condition at 707 is satisfied. Step 603 is thereby provided with a finalized forecast for each DFU selected at step 601.

Referring again to FIG. 6, the user is presented with each finalized forecast for the DFUs and is able to review and compare the forecasts. At this step, the user is able to compare, for example, forecasts for model variants, location variants, and products that fall into the same demand groups (depending upon what DFUs were selected at step 601) to select the best current forecast for a particular product (demand unit) within a market. These selected forecasts are then published at step 604.

When the forecasts for the selected DFUs are published at step 604, these demand forecasts are in essence made "official" in that they then are associated with (i.e., as opposed to an alternative model variant DFU's forecast that was found to be less desirable at step 603) the appropriate demand unit, demand group and location combination across the entire organization. In this manner, published forecasts can be used by other parts of the organization including separate departments (such as sales and marketing) or by downstream electronic planning systems (such as manufacturing planning, supply chain planning, and transportation network planning systems).

According to more preferred embodiments of the present invention, adjustments can be made to a published demand forecast at step 605 (depicted in broken lines to emphasize the optional nature of the step) in order to account for the relative popularity of a product promotion program (rebate, drop in price, etc.) once the program is begun by using actual demand (typically, sales) data as it becomes available. In such embodiments, the invention uses available actual demand data to calculate a forecast adjustment factor "FAF" which is used to modify the current published forecast according to the equation:

$$\text{Forecast}_i = \text{Forecast}_o * FAF \quad \text{(Eq. 5)}$$

wherein "Forecast$_i$" is the initial "pre-break" demand forecast (i.e., the current published forecast before the actual demand data is taken into account) and "Forecast$_o$" is the adjusted "post-break" (i.e., after the actual demand data is taken into account) demand forecast. The FAF is calculated according to the following equation:

$$FAF = \frac{\text{Pre-Break Actual Demand}}{\text{Pre-Break Forecasted Demand}} \quad \text{(Eq. 6)}$$

where an adjusted forecast, or Day "X" Post-Break Forecast, is calculated from the date X through the end of the promotion program with "X" being the date on which the adjusted forecast is calculated. By way of example, on the morning of the third day of a price promotion for a given DFU an adjusted forecast is desired, the actual demand data (in the form of retail sales) for the first two days are depicted below in Table 2 below.

TABLE 2

| Date | Pre-Break Forecast (# Units) | Actual Sales (# Units) |
|---|---|---|
| Day 1 | 45 | 52 |
| Day 2 | 42 | 55 |

Calculated according to Equation 6 above, the forecast adjustment factor would be:

$$(52+55)/(45+42)=1.2299$$

thus creating a Day 3 Post-Break Forecast as depicted in Table 3 below.

TABLE 3

| Date | Pre-Break Forecast (# Units) | Day 3 Post-Break Forecast |
|---|---|---|
| Day 3 | 21 | 26 |
| Day 4 | 25 | 31 |
| Day 5 | 28 | 34 |
| Day 6 | 31 | 38 |
| Day 7 | 35 | 43 |

When reviewing Table 3 above, it should be noted that post-break forecast values should be rounded up to the next integer number. In this manner, an adjusted forecast is obtained and can be published by the user within its organization for use in, among other things, supply, manufacturing and transportation planning.

It will be understood by one of ordinary skill in the art that demand forecasting process 600 will require different amounts and types of interaction and oversight by users depending upon the amount of "new" information being processed. In instances wherein demand history stream data has already been segregated into base and non-base history (during previous runs of demand forecasting process 600) and no new history is available, step 701 could merely entail the demand forecasting system identifying the appropriate previously-segregated history stream in the appropriate database. Similarly, if the user over time has developed a particularly accurate and trusted model for forecasting demand for a particular DFU, then review of a finalized forecast at step 603 above would most likely serve as a mere formality before the forecast is published at step 604. Conversely, in instances wherein a new product or DFU has been defined, relatively more interaction by the user will be necessary. However, in this manner, as records are built up in the various databases regarding previous runs of demand forecasting process 600, the work of the user in making decisions (identifying and segregating histories, etc.) typically is lessened.

Figure 8:
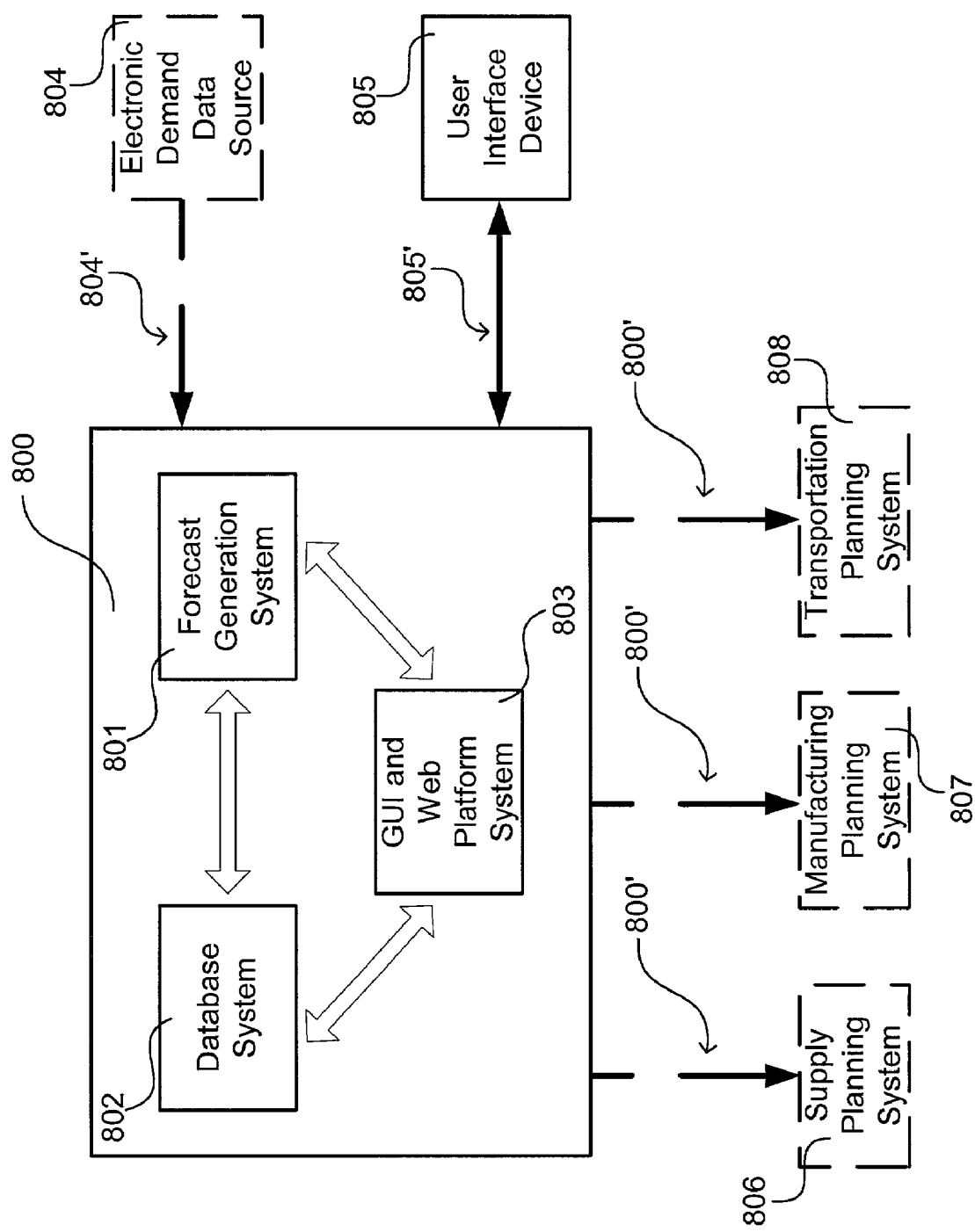
FIG. 8 is a schematic diagram depicting the operational aspects and interactions of an electronic demand forecasting system according to preferred embodiments of the present invention.

Referring now to FIG. 8, there is schematically depicted components of an electronic demand forecasting system 800 for creating and publishing demand forecasts according to one embodiment of the present invention. The operational aspects and interactions of individual elements of one preferred embodiment of the electronic demand forecasting system 800 has previously been described above with respect to FIG. 3. As shown in FIG. 8, the electronic demand forecasting system 800 is comprised of a plurality of computerized systems in electronic intercommunication, including: a forecast generation system 801, a GUI (graphical user interface) and Web platform system 803, and a database system 802. Each of the systems 801–803 that form the forecasting system 800 are comprised of suitable servers (computing devices), storage devices (including databases), memory devices and support hardware as is known in the art of computer networks to achieve the functions of each system 801–803 as hereinafter described. It will, however, be readily appreciated by one of ordinary skill in the art that the functions of systems 801–803 can be alternatively performed by a single computing device or by many computing devices in electronic communication. The three systems 801–803 that comprise electronic demand forecasting system 800 are meant to merely demonstrate how a preferred system according to the present invention would operate in a sample working environment.

Forecast generation system 801 provides the processing power, support electronics and logic necessary to create models for DFUs from appropriate history streams, statistical forecasting algorithms and user inputs according to the processes described above with respect to FIGS. 3, 5, 6 and 7. As shown by the figure, forecast generation system 801 is in electronic communication with the GUI and Web platform system 803 to obtain inputs and provide outputs to the user. Further, forecast generation system 801 and is in electronic communication with the database system to obtain demand history data, DFU descriptions, algorithm functions and other stored data as necessary during a forecast generation process.

GUI and Web platform system 803 acts a front-end to the forecasting system 800 and allows users to provide inputs as necessary to the system as well as view and compare forecasts. As is known in the art of computer networking, a user can use a user interface device 805, such as a workstation or personal computer, to view and input data 805' as required by the processes described above. Since preferred embodiments of the present invention are computer networks, a front-end user interface is necessary to permit users to interact with one or more databases in the database system 802 and to define a plurality of decision making algorithms. The front-end user interface permits users to review and modify demand forecasts and adopt particular approved forecasts for publishing across the users' organization. Preferably, the front-end user interface supports graphical interaction and access over the distributed networks such as the Internet. As such, the present invention helps organizations understand the impact of events on demand. Further, the use of a distributed network can provide visibility of demand forecasts across an entire collaborative organization.

Database system 802 comprises electronic data storage devices to store various information used by the forecast generation system 801 to generate demand forecasts according to the present invention. The database system may comprise a plurality of relational databases (such as a history database, DFU database, and forecast database) or a single unified database table. Information can be obtained from the databases by the GUI and Web platform system 803 or the forecast generation system 801 as necessary or can be obtained therefrom.

Optionally, demand forecasting system 800 can be electronically interconnected to external computing systems to provide additional flexibility and utility (such external computing systems are shown in broken lines in FIG. 8 to signify their optional nature). For instance, demand forecasting system 800 optionally can be electronically connected to an external electronic demand data source 804 to obtain data feeds 804' regarding up to the minute demand data (such as sales information). In this manner, the maintenance of history stream data can be simplified by taking advantage of data generated and inputted by third parties (as opposed to users having to enter it themselves). Similarly, demand forecasting system 800 optionally can be electronically connected to external electronic computing and management systems within and without the organization, including a supply planning system 806, manufacturing planning system 807 and a transportation planning system 808. Understandably, demand forecasts published by the forecast generation system 801 can be transmitted 800' electronically to systems 806–808 for use in proactively readying other areas of the organization for expected demand. For example, the published forecasts can be used to order necessary raw materials, schedule plant resources for manufacturing according to the expected amount of demand, and for reserving the amount of transportation services expected to be necessary to distribute orders.

One of ordinary skill in the art will appreciate that the demand forecasting algorithms may be modified to take into account specific needs and/or problems encountered in particular industries or situations. Thus, the illustrative algorithms should not be construed to limit the present invention as is claimed.

Although the present invention is preferably implemented in software, this is not a limitation of the present invention as those of ordinary skill in the art can appreciate that the present invention can be implemented in hardware or in various combinations of hardware and software, without departing from the scope of the invention. Modifications and substitutions by those of ordinary skill in the art are considered to be within the scope of the present invention, which is not to be limited except by the claims that follow.

The foregoing description of the preferred embodiments of the present invention has been presented for the purposes of illustration and description. It will be apparent to those of ordinary skill in the art that various modifications and variations can be made to the disclosed embodiments and concepts of the present invention without departing from the spirit or scope of the invention as claimed.

What is claimed is:

1. A method for forecasting future demand, said method comprising the steps of:
   setting up a database and defining Demand Forecasting Units (DFUs), each of said DFUS pertaining particular product at a particular location;
   preparing a forecast for each of the DFUS;
   reviewing said prepared forecasts;
   and for one or more of said DFUS, publishing said reviewed forecasts associated with said DFUS;
   wherein said forecast preparing step further comprises: identifying active DFUS, and for each of said active DFUS: preparing a history stream;
   associating a demand forecasting algorithm said history stream;
   and using said history stream and said demand forecasting algorithm to generate an active DFU forecast;
   wherein said step of using said history stream and said demand forecasting algorithm to generating an active DFU forecast further comprises: selecting history data related to said history stream, and performing a least-squares regression on said history data;
   wherein said step selecting history data related to said history stream comprises identifying a maximum number of terms said history stream, and wherein the step of performing a least-squares regression comprises using only the maximum number of terms;
   wherein said step of using said history stream and said demand forecasting algorithm to generating an active DFU forecast further comprises testing of said terms for significant amplitude.

2. The method of claim 1, wherein said step of using said history stream and said demand forecasting algorithm to generating an active DFU forecast further comprises using only said terms having significant amplitude greater than a preset minimum.

* * * * *